US008339688B2

(12) United States Patent  
Nakahara

(10) Patent No.: US 8,339,688 B2
(45) Date of Patent: Dec. 25, 2012

(54) IMAGE FORMING APPARATUS

(75) Inventor: Hidetada Nakahara, Kyoto (JP)

(73) Assignee: Murata Machinery, Ltd., Kyoto (JP)

(*) Notice: Subject to any disclaimer, the term of this patent is extended or adjusted under 35 U.S.C. 154(b) by 330 days.

(21) Appl. No.: 12/893,151

(22) Filed: Sep. 29, 2010

(65) Prior Publication Data

US 2011/0075232 A1 Mar. 31, 2011

(30) Foreign Application Priority Data

Sep. 30, 2009 (JP) ................................. 2009-227692

(51) Int. Cl.
*H04N 1/04* (2006.01)
(52) U.S. Cl. ......... 358/498; 358/474; 358/497; 358/496
(58) Field of Classification Search .................. 358/498, 358/474, 497, 496
See application file for complete search history.

(56) References Cited

U.S. PATENT DOCUMENTS

| 4,989,099 A * | 1/1991 | Koshiyouji et al. ........... 358/474 |
| 7,031,028 B2 * | 4/2006 | Liu et al. ........................ 358/406 |
| 7,567,365 B2 * | 7/2009 | Tsujimoto et al. ............ 358/474 |

FOREIGN PATENT DOCUMENTS

JP 2001-215638 A 8/2001

\* cited by examiner

*Primary Examiner* — Houshang Safaipour
(74) *Attorney, Agent, or Firm* — Keating & Bennett, LLP

(57) ABSTRACT

Four mounting units are linearly disposed in a machine body of an image forming apparatus. First and second platen covers that differ from each other in weight also differ from each other in interval between support units. The first platen cover can be mounted on the machine body using the mounting units, and the second platen cover can be mounted on the machine body using the mounting units.

6 Claims, 14 Drawing Sheets

IMAGE FORMING APPARATUS

CROSS-REFERENCE TO RELATED APPLICATIONS

This application claims priority under 35 U.S.C. 119 to Japanese Patent Application No. 2009-227692, filed on Sep. 30, 2009, which application is hereby incorporated by reference in its entirety.

BACKGROUND OF THE INVENTION

1. Field of the Invention

The present invention relates to an image forming apparatus including an image scanning unit of an electronic copying machine in an upper portion of a machine body, and particularly to improvements to a mounting structure of a platen cover that opens and closes a document scanning surface of the image scanning unit.

2. Description of the Related Art

In the present invention, the platen covers having different specifications are mounted on the machine body of the same image forming apparatus. This technique is already disclosed in a publicly-known document. In the publicly-known document, a sensor unit can be shared among the platen covers in order to sense a closing angle of the platen cover, even if the platen covers having different specifications are mounted on the machine body. The closing angle of the platen cover, sensed with the sensor unit, can be set to the same angle. In the publicly-known document, specific examples of the platen covers having different specifications include a platen cover that serves only to hold a document and a platen cover that has a function of editing a scanned image in addition to the function of holding the document.

When at least two kinds of platen covers having different weights are mounted on the same machine body, i.e., due to the presence or absence of the function of editing the scanned image or the presence or absence of the automatic document feeder, conventionally it is necessary to change a support structure for supporting the platen cover. Specifically, conventionally the support structure is changed by exchanging the metallic support frame that supports a platen cover attaching unit. Therefore, the exchange of the support frame becomes troublesome, and it is difficult to efficiently perform the mounting work or exchange work of the platen cover. Thus, there is a demand for establishing a mounting structure in which the mounting work or exchange work of the platen cover can be performed efficiently and rapidly without exchanging the support frame.

Further, in the conventional image forming apparatus, it is necessary to develop a whole structure of the machine body such that the support frame can be exchanged, which results in a problem in that a degree of design freedom of the whole apparatus decreases. Moreover, it is necessary to design and prepare a plurality of kinds of frames, and the number of components is inevitably increased, which results in a problem in that the overall cost of the image forming apparatus increases.

SUMMARY OF THE INVENTION

Preferred embodiments of the present invention provide an image forming apparatus in which platen covers having different specifications can be exchanged efficiently and rapidly without performing the exchange work of the support frame of the machine body.

Additional preferred embodiments of the present invention provide an image forming apparatus in which the number of components can be decreased to reduce the overall cost of the image forming apparatus without needing to prepare a plurality of different types of support frames.

In accordance with a preferred embodiment of the present invention, an image forming apparatus includes an image scanning unit that is provided in an upper portion of a machine body to scan document image information, a platen cover that includes a pair of support units and a cover body, the support units each including a hinge member, the cover body being supported while being openable through the hinge member, the cover body opening and closing a document scanning surface located in an uppermost surface of the image scanning unit, and a mounting unit that is provided adjacent to the document scanning surface in the upper portion of the machine body in order to mount the support unit on the machine body.

At least three mounting units are linearly disposed in the machine body. Two kinds of first and second platen covers, which are different from each other in weight and spacing between the support units, are mounted on the machine body using two mounting units selected from the at least three mounting units.

In the machine body, a platen cover attaching unit including a bottom surface oriented upward is provided adjacent to the document scanning surface. The mounting unit preferably has a hollow cylinder configuration that extends upward from a bottom surface of the platen cover attaching unit, the hollow cylinder including an opening on a top thereof. The support unit includes a columnar support body that is attached to the mounting unit by putting the columnar support body in the mounting unit. Support bodies constituting the two kinds of platen covers are different from each other in external dimension, and the hollow cylinder mounting units are different from each other in internal dimension according to the external dimensions of the support bodies.

In addition to the hollow cylinder mounting unit, a metallic mounting unit is provided while being detachably attached to the platen cover attaching unit. A third platen cover including a metallic support unit fixed to the metallic mounting unit is configured to be able to be mounted on the machine body.

In accordance with a preferred embodiment of the present invention, an image forming apparatus includes an image scanning unit that is provided in an upper portion of a machine body to scan document image information, a platen cover that includes a pair of support units and a cover body, the support units each including a hinge member, the cover body being supported while being openable through the hinge member, the cover body opening and closing a document scanning surface located in an uppermost surface of the image scanning unit, and a mounting unit that is provided adjacent to the document scanning surface in the upper portion of the machine body in order to mount the support unit on the machine body.

In the machine body, a platen cover attaching unit including a bottom surface oriented upward is provided adjacent to the document scanning surface. A first mounting structure and a second mounting structure are provided in the platen cover attaching unit, the first mounting structure including two hollow cylinder mounting units that attach a first platen cover not including an automatic document feeder, the second mounting structure including two hollow cylinder mounting units that attach a second platen cover including the automatic document feeder.

An interval between the two mounting units constituting the second mounting structure is preferably set to be larger than an interval between the two mounting units constituting the first mounting structure, and an external dimension of the support unit of the first platen cover is preferably set to be smaller than an external dimension of the support unit of the second platen cover. Internal dimensions of the two mounting units constituting the first mounting structure are preferably set to be smaller than internal dimensions of the two mounting units constituting the second mounting structure according to the external dimensions of the support units of the first and second platen covers.

In addition to the first and second platen covers, a third platen cover including an automatic document feeder is configured to be able to be mounted on the machine body. In order to mount the third platen cover, a metallic mounting piece is provided in the platen cover attaching unit in addition to the hollow cylinder mounting units constituting the first and second mounting structures while detachably attached to the platen cover attaching unit. The third platen cover includes a metallic support unit fixed to the metallic mounting piece with fastening member such as a screw, for example.

A first decorative cover and a second decorative cover are configured to be able to be mounted on the machine body, the first decorative cover including two openings at a position corresponding to each of the two mounting units constituting the first mounting structure, the second decorative cover including two openings at a position corresponding to each of the two mounting units constituting the second mounting structure. An opening that allows a fastening member such as a screw to be inserted to mount the third platen cover is provided in the first or second decorative cover.

In a preferred embodiment of the present invention, at least three mounting units preferably are linearly disposed in the machine body. The first and second platen covers, which are different from each other in weight, differ from each other in interval or spacing between the pair of support units. In addition, the first and second platen covers can be mounted on the machine body using two mounting units selected from the at least three mounting units. Accordingly, only the support structure (the support frame structure of the machine body) of the at least three mounting units is configured to be able to deal with the heaviest platen cover, which allows the platen covers to be mounted on the machine body unlike the conventional technique in which the exchange of the support frame is required even if the platen cover has a large weight. Because the work of exchanging the support frame can be eliminated in mounting the platen cover, the mounting work of the platen cover can be performed rapidly and efficiently. It is not necessary to prepare the plurality of kinds of support frames, and the number of components is decreased. Therefore, the overall cost of the image forming apparatus can be reduced.

Generally, in the light-weight platen cover (for example, the first platen cover) that does not include the ADF, the gravity center position of the whole cover is substantially matched with the gravity center position of the cover body that opens and closes the document scanning surface. Accordingly, the two support units are often provided at substantially equal positions distant from both side ends in the right and left direction of the cover body.

On the other hand, in the heavy-weight platen cover (for example, the second platen cover) that includes the ADF, the cover body is larger in external dimension than the cover body of the first platen cover that does not include the ADF. In addition, the gravity center position of the whole cover depends on the position at which the cover body of the ADF is mounted, and the gravity center position of the whole cover is inevitably biased onto the ADF side compared with the gravity center position of the cover body. Therefore, in the second platen cover, in many cases, one of the support units is provided in a side portion of the ADF while the other support unit is provided on the other end side in the right and left direction of the cover body.

The outer shape of the cover body varies in size according to the presence or absence of the ADF, and the platen cover that does not include the ADF differs from the platen cover that includes the ADF in position of the support unit and interval between the support units. In a preferred embodiment of the present invention, in order to deal with the differences of the position of the support unit and the interval between the support units, which are derived from the presence or absence of the ADF, as described above, the at least three mounting units are linearly disposed in the machine body, and both the platen covers can be mounted on the machine body using the two mounting units. Accordingly, the work of exchanging the support frame of the mounting unit is eliminated unlike the conventional technique, and the mounting work or exchange work of the platen cover can be performed rapidly and efficiently. It is not necessary to prepare the plurality of kinds of support frames, and the number of components is decreased. Therefore, the overall cost of the image forming apparatus can be reduced.

In a preferred embodiment of the present invention, the mounting unit preferably includes a hollow cylinder in the platen cover attaching unit, and the internal dimension of the mounting unit varies according to the external dimension of the support body constituting the support unit. Therefore, the platen cover can be mounted on the machine body smoothly and reliably only by putting the support body in the mounting unit.

As described above, in this kind of platen cover, the position of the support unit and the interval between the support units vary according to the difference of weight derived from the presence or absence of the ADF. However, the external dimension of the support body may sometimes vary according to the total weight of the platen cover. That is, occasionally, the external dimension of the support body of the heavy-weight platen cover (that includes the ADF) is preferably set to be larger than that of the support body of the light-weight platen cover (that does not include the ADF).

In a preferred embodiment of the present invention, because the mounting unit includes the hollow cylinder having the opening on the top thereof, the mounting unit can reliably deal with the support bodies having different external dimensions only by previously placing the mounting units having different internal dimensions. Accordingly, it is not necessary to change the design of the complicated mounting unit, and the mounting unit can deal with the change of the external dimension of the support body at low cost.

Further, in this kind of platen cover, the weight strongly depends on the type of the ADF in addition to the presence or absence of the ADF. That is, the platen cover (for example, the third platen cover) including the ADF to which the image scanning device is added to scan the backside of the document is heavier than the platen cover including the ADF having only the document conveying function. Accordingly, in some cases, the hollow cylinder mounting unit hardly supports the third platen cover.

Therefore, in a preferred embodiment of the present invention, in order to deal with the third platen cover including the ADF to which the image scanning device is added to scan the back side of the document, the metallic mounting piece is provided in addition to the hollow cylinder mounting unit while detachably attached to the platen cover attaching unit. The metallic support unit is also provided in the third platen cover. The third platen cover can be mounted on the machine body by fixing the support unit to the mounting piece with the fastening member such as a screw, for example. Therefore, because the strong support structure can be established by the metallic mounting piece and the metallic support unit, the heavy-weight third platen cover can be mounted on the machine body easily and reliably. Moreover, because the change of the frame is not required, the third platen cover can be mounted on the machine body rapidly and efficiently.

In a preferred embodiment of the present invention, the first mounting structure and the second mounting structure are provided in the machine body, the first mounting structure including two mounting units that attach the first platen cover, and the second mounting structure including two mounting units that attach the second platen cover including the automatic document feeder. Therefore, only the support structure (the support frame structure of the machine body) of the mounting unit is configured to be able to deal with the second platen cover, which allows the heavy-weight second platen cover to be mounted on the machine body unlike the conventional technique in which the exchange of the support frame is required. Because the work for exchanging the support frame can be eliminated in mounting the platen cover, the mounting work of the platen cover can be performed rapidly and efficiently. It is not necessary to prepare the plurality of kinds of support frames, and the number of components is decreased. Therefore, the overall cost of the image forming apparatus can be reduced.

In a preferred embodiment of the present invention, the interval between the two mounting units constituting the second mounting structure is preferably set to be larger than the interval between the two mounting units constituting the first mounting structure. That is, the interval between the two mounting units constituting the second mounting structure is preferably larger than that of the first mounting structure. Therefore, during the opening and closing operation of the heavy-weight second platen cover, because generation of a torsional moment is effectively prevented to decrease stresses applied to the mounting unit and the support unit, the second platen cover can be stably supported. Accordingly, the breakage and the like of the mounting unit and the support unit can be reliably prevented to contribute to the improvement of reliability of the image forming apparatus.

In a preferred embodiment of the present invention, the external dimension of the support unit of the second platen cover is preferably set to be larger than the external dimension of the support unit of the first platen cover, and the internal dimension of the mounting unit constituting the second mounting structure is preferably set to be larger than the internal dimension of the mounting unit constituting the first mounting structure.

Therefore, the second platen cover can be stably supported by the support unit and the mounting unit, which have large dimensions.

In addition to the hollow cylinder mounting unit, the metallic mounting unit is detachably attached to the platen cover attaching unit, the metallic support unit is provided in the third platen cover, and the metallic support unit is fixed to the metallic mounting unit with the fastening member such as a screw, which allows the third platen cover to be mounted on the machine body. Therefore, because the strong support structure can be established by the metallic mounting unit and the metallic support unit, the heavy-weight third platen cover having the function of scanning the both sides of the document can be mounted on the machine body easily and reliably. Because the change of the support frame is not required, the third platen cover can be mounted on the machine body rapidly and efficiently.

The first decorative cover and the second decorative cover are configured to be able to be mounted on the machine body, the first decorative cover including two openings at a position corresponding to each of the two mounting units of the first mounting structure, and the second decorative cover including two openings at a position corresponding to each of the two mounting units of the second mounting structure. The opening that allows a fastening member such as a screw to be inserted to mount the third platen cover is provided in the first or second decorative cover. Therefore, the use of the two kinds of decorative covers (first and second decorative covers) can deal with and accommodate the three kinds of platen covers (first to third platen covers). Accordingly, compared with the mode in which the three kinds of decorative covers are prepared according to the platen covers, the number of components concerning the decorative cover can be decreased, the component can be shared, and the overall cost of the image forming apparatus can be reduced.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

FIGS. 1 to 14 illustrate preferred embodiments in which an image forming apparatus according to a preferred embodiment of the present invention is applied to a multifunction peripheral including a copy function, a facsimile function, and the like. In the preferred embodiments of the present invention, front and back, right and left, and up and down follow crossed arrows illustrated in FIGS. 2 and 3 and displays of the front and back, right and left, and up and down indicated near each arrow.

Figure 2:
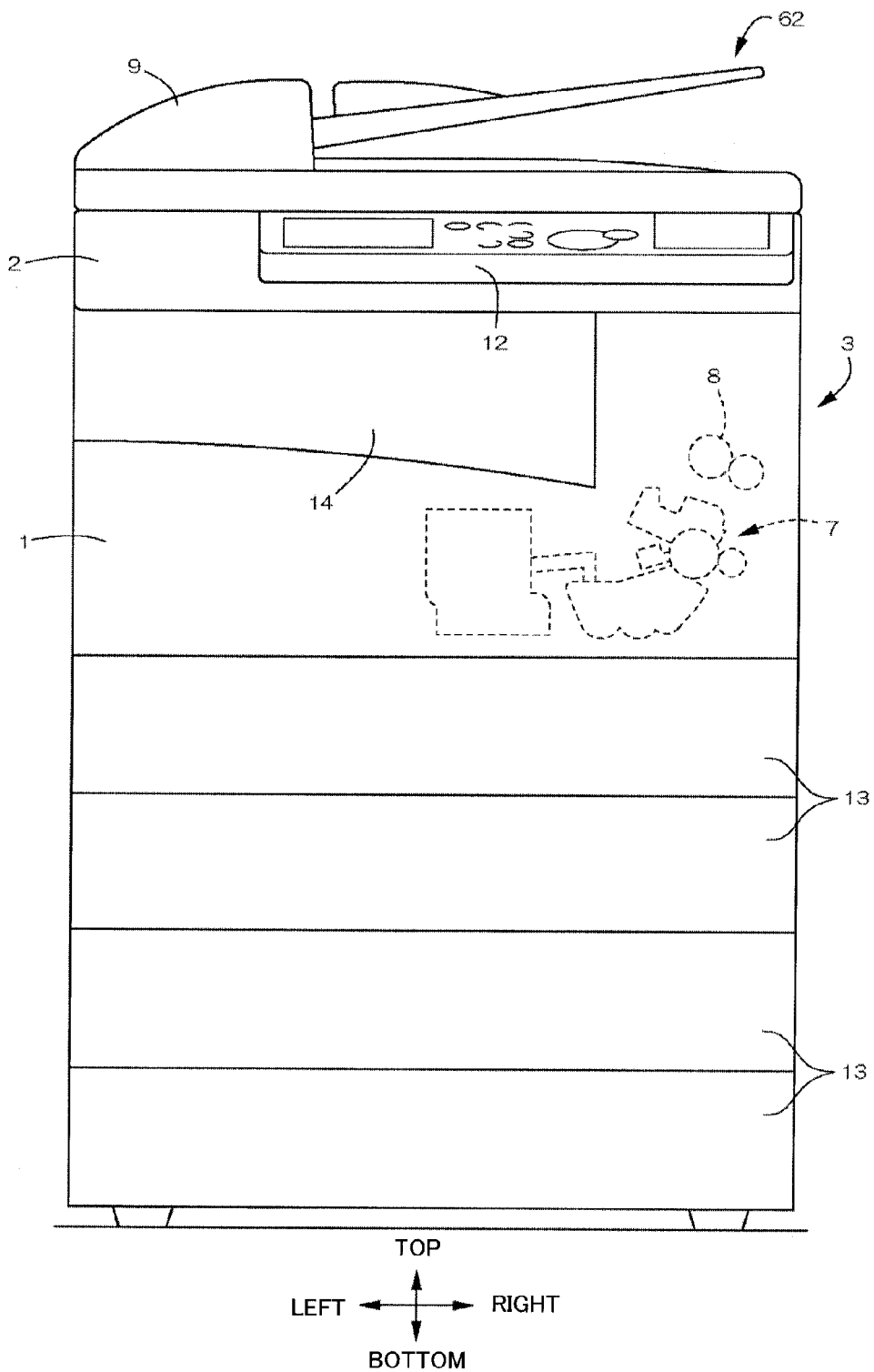
FIG. 2 is a front view conceptually illustrating an image forming apparatus.

In FIG. 2, the multifunction peripheral includes a machine body 3 and a platen cover 62. The machine body 3 includes a recording unit 1 and an image scanning unit 2 that is disposed above the recording unit 1. The platen cover 62 is provided above the machine body 3 to open and close a document placing table 16 (see FIG. 3) of the image scanning unit 2. An image recording device 7 and a fixing device 8 are provided in the recording unit 1.

Figure 1:
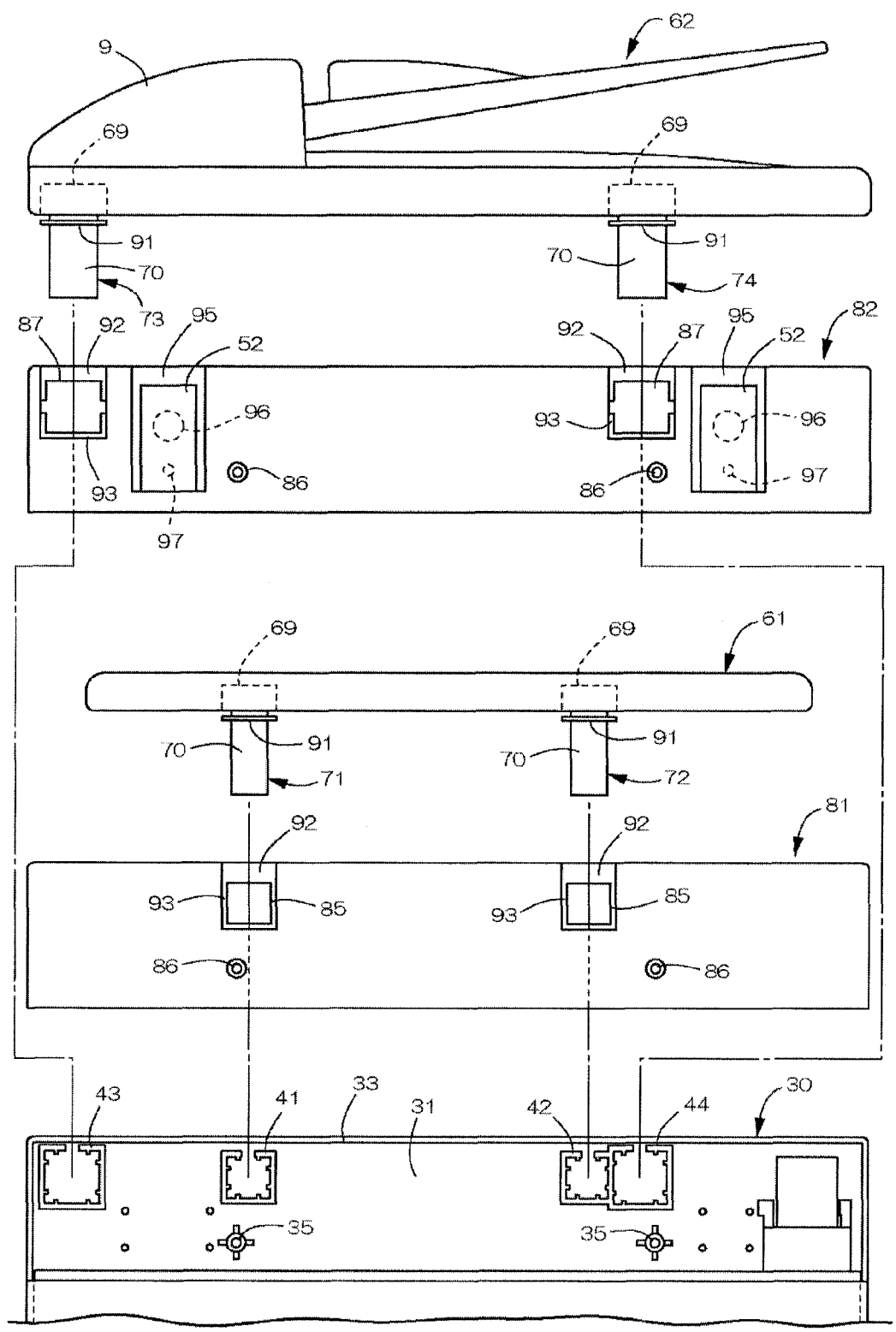
FIG. 1 illustrates a structure in which first and second platen covers are mounted on a machine body.
Figure 11:
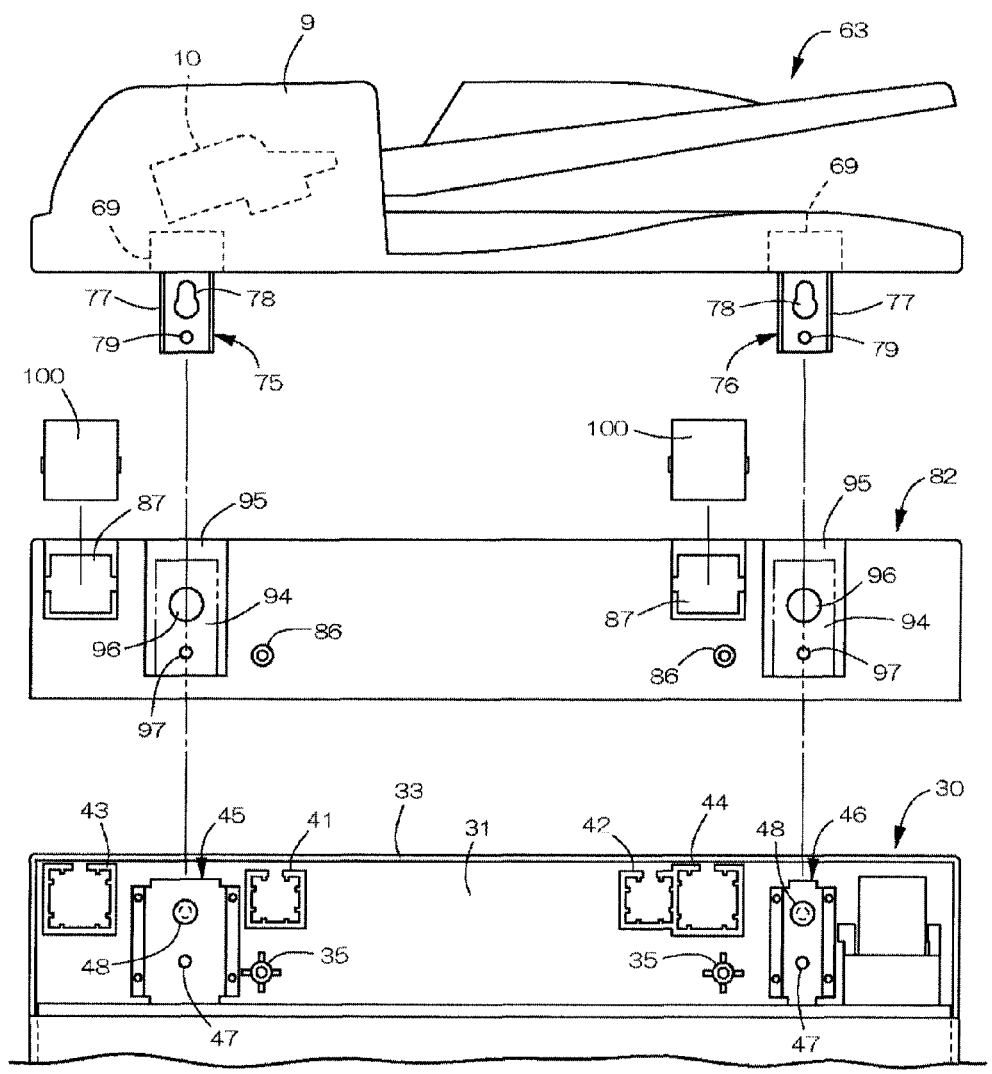
FIG. 11 illustrates a method for mounting a third platen cover on the machine body.

An Automatic Document Feeder (ADF) 9 is provided in an upper portion of the platen cover 62 illustrated in FIG. 2. As illustrated in FIG. 1, a platen cover 61 that does not include the ADF 9 can be amounted on the machine body 3 instead of the platen cover 62. As illustrated in FIG. 11, a platen cover 63 that includes the ADF 9 to which an image scanning device 10 (an image scanning device for reading a back side of the document) is added can be mounted on the machine body 3.

Hereinafter, the platen cover 61 that does not include the ADF 9 is referred to as "first platen cover", the platen cover 62 that includes the ADF 9 is referred to as "second platen cover", and the platen cover 63 that includes the ADF 9 to which the image scanning device 10 is added is referred to as "third platen cover".

Figure 5:
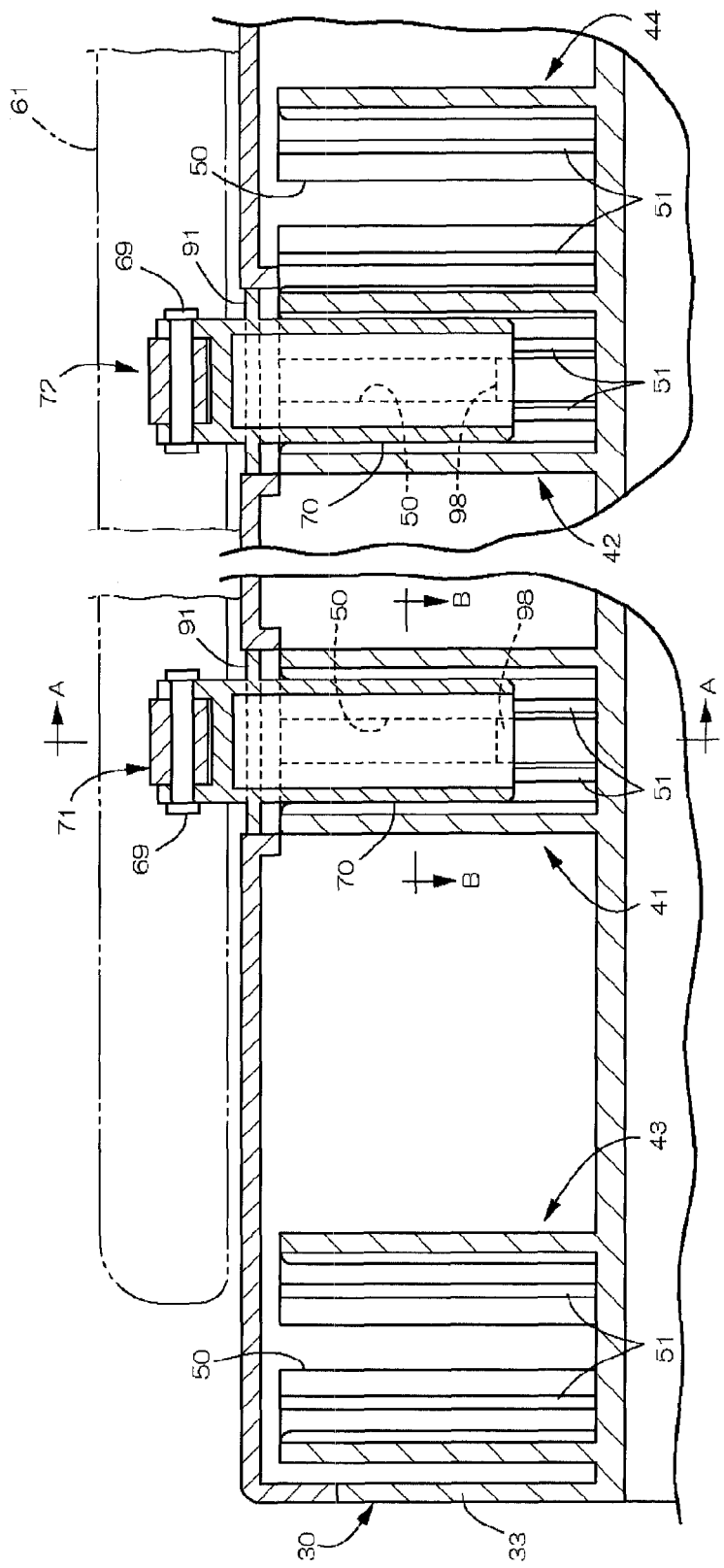
FIG. 5 is a longitudinal sectional front view illustrating a mounting structure of the first platen cover.
Figure 6:
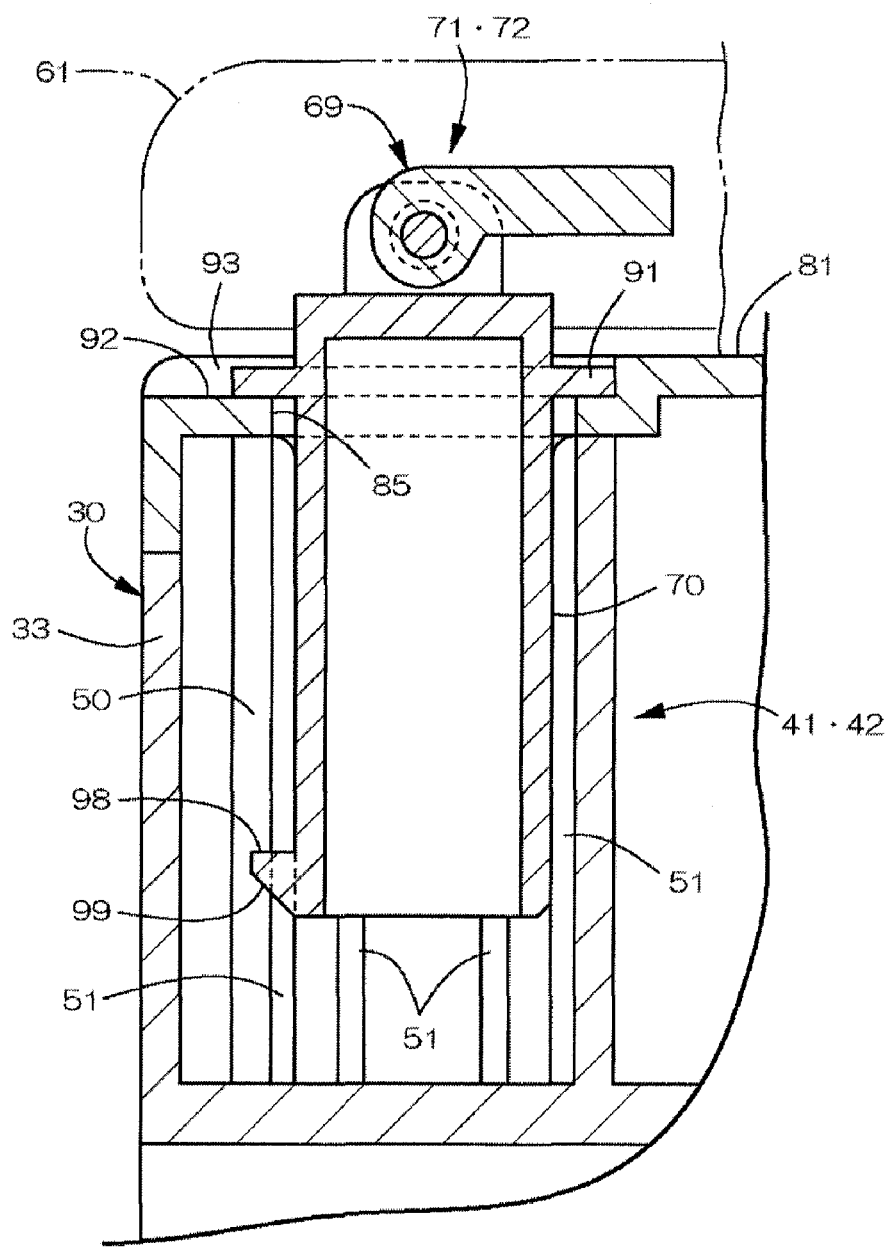
FIG. 6 is a sectional view taken along line A-A of FIG. 5.

As illustrated in FIGS. 1, 5, and 6, a pair of right and left support units 71 and 72 including a hinge unit 69 and a plastic hollow square pillar support column 70 are provided in the first platen cover 61. The platen covers 61 and 62 can be mounted on the machine body 3 by inserting the support columns 70 of the support units 71 and 72 in a pair of right and left mounting units 41 and 42 formed in the machine body 3. Similarly, as illustrated in FIG. 1, a pair of right and left support units 73 and 74 including the hinge unit 69 and the plastic hollow square pillar support column 70 is provided in the second platen cover 62. The platen covers 61 and 62 can be mounted on the machine body 3 by inserting the support columns 70 of the support units 73 and 74 in a pair of right and left mounting units 43 and 44 provided in the machine body 3.

As illustrated in FIG. 11, a pair of right and left support units 75 and 76 including the hinge unit 69 and a metallic support plate 77 is provided in the third platen cover 63. The third platen cover 63 can be mounted on the machine body 3 by attaching the support columns 77 of the support units 75 and 76 to a pair of right and left metallic mounting pieces 45 and 46 mounted on the machine body 3 using a screw 47 and an attaching bolt 48, for example. As illustrated in FIG. 11, a calabash-shaped through hole 78 in which large and small through holes are coupled to allow the attaching bolt 48 to be inserted and a through hole 79 for the screw 47 are provided in each support plate 77.

As illustrated in FIG. 2, an operation panel 12 is provided in a front surface of the image scanning unit 2. A paper feed cassette 13 is disposed below the recording unit 1. A recording sheet in which an image is printed through the image recording device 7 and fixing device 8 is discharged to a paper exit unit 14 provided below the image scanning unit 2.

Figure 3:
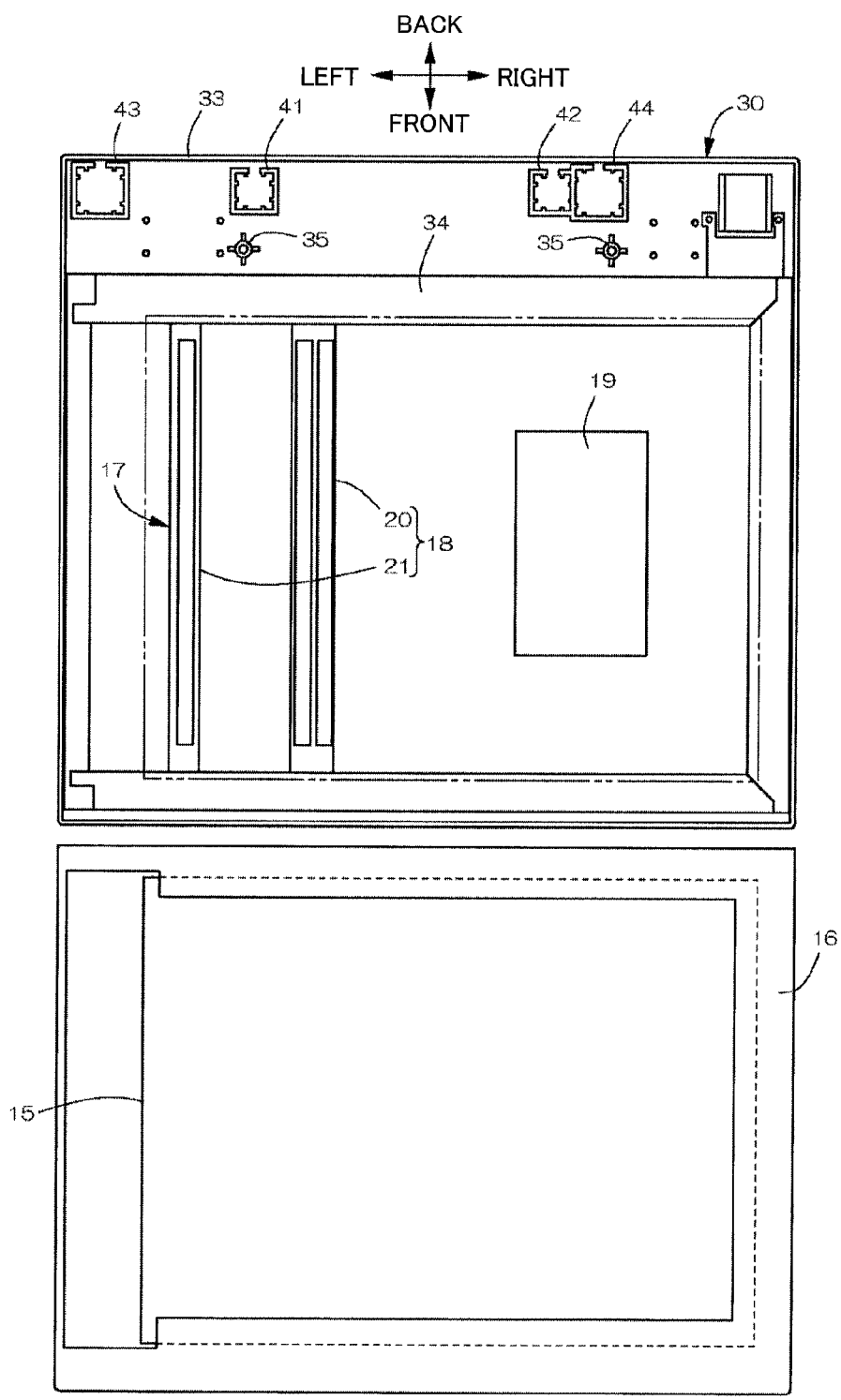
FIG. 3 is a plan view illustrating a configuration of an image scanning unit provided in the image forming apparatus.
Figure 4:
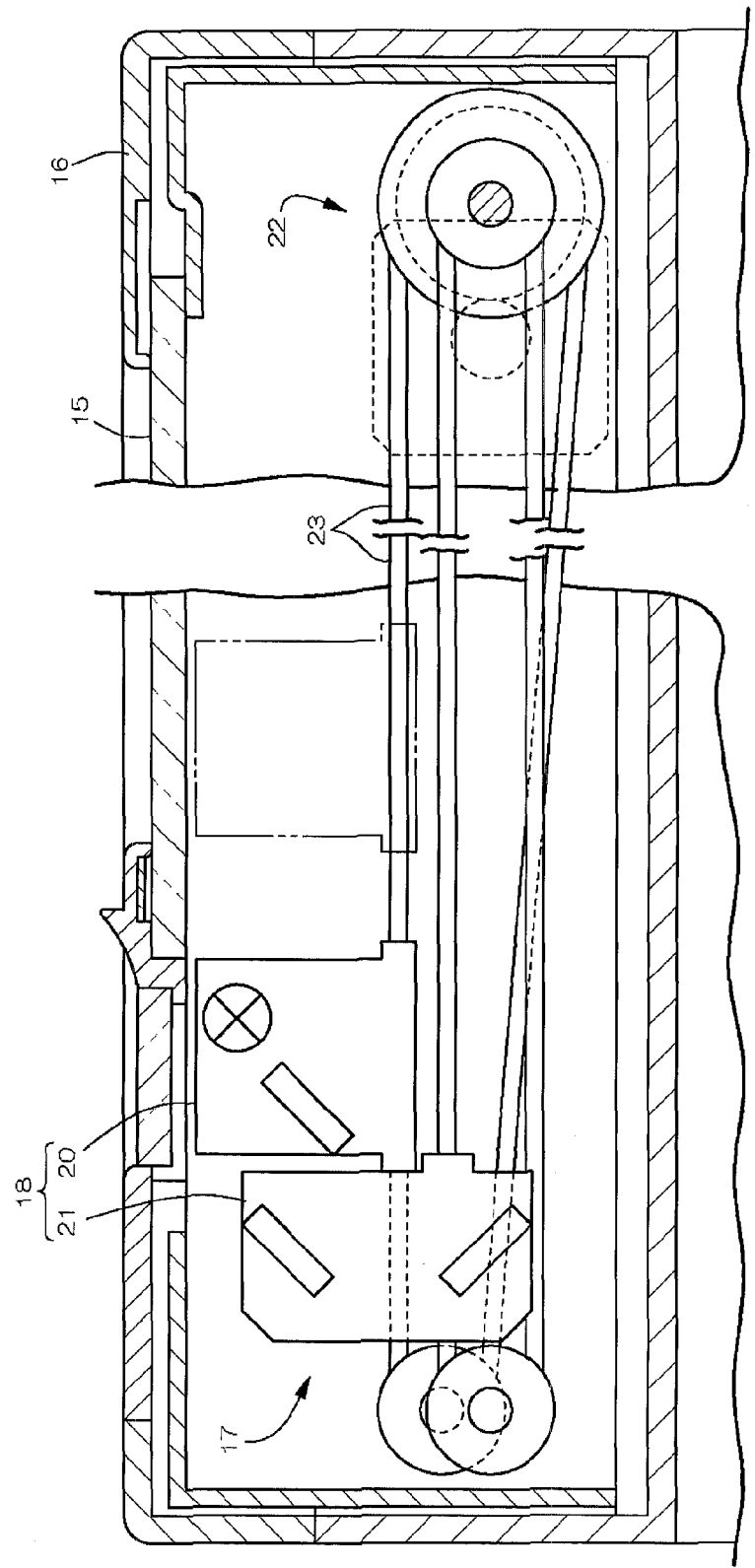
FIG. 4 is a longitudinal sectional front view illustrating the configuration of the image scanning unit.

As illustrated in FIGS. 3 and 4, the image scanning unit 3 includes a document placing table 16 whose upper surface is covered with a platen glass 15. A scanning unit 17, a carriage 18, and a CCD image sensor 19 are disposed in the document placing table 16. The carriage 18 supports an optical system of the scanning unit 17. The carriage 18 includes a first carriage 20 and a second carriage 21. Each of the first and second carriages 20 and 21 includes a structure having a long frame shape in a front and back direction. A driving device 22 that drives the carriages 20 and 21 is provided to define an entrainment transmission structure in which a belt 23 is used as a power transmission medium.

As illustrated in FIGS. 1, 3, and 5, a step unit 30 (platen cover attaching unit) is provided at the back of the document placing table 16 in order to mount the platen covers 6 (61, 62, and 63) on the machine body 3. The step unit 30 includes a bottom surface 31 that goes down by one step from the upper surface of the document placing table 16, and the bottom surface 31 is oriented upward. The four mounting units 41, 42, 43, and 44 are projected upward in the bottom surface 31. A rear portion and right and left side portions of the step unit 30 are surrounded by a housing 33 of the machine body 3. Front and back frames of a sheet-metal frame 34 having a square frame shape divide the step unit 30 and the document placing table 16. In FIG. 1, reference numerals 35 and 35 denote a pair of screw bosses which receive screws (not illustrated) in order to fix decorative covers 81 and 82 described below.

Figure 7:
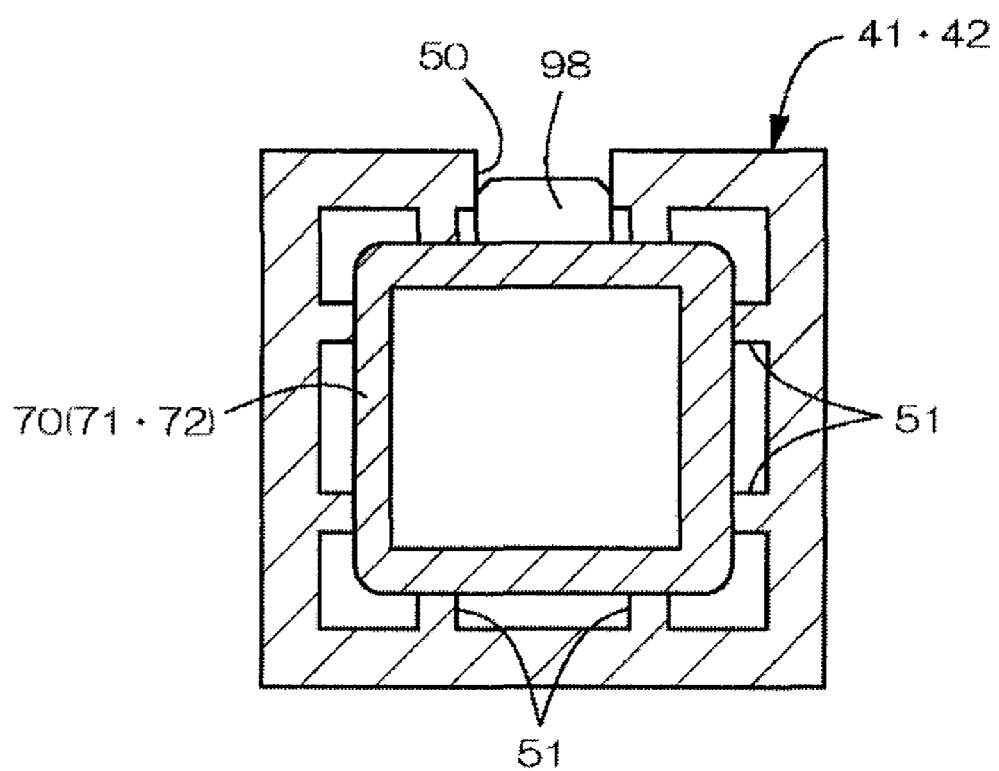
FIG. 7 is a sectional view taken along line B-B of FIG. 5.
Figure 10:
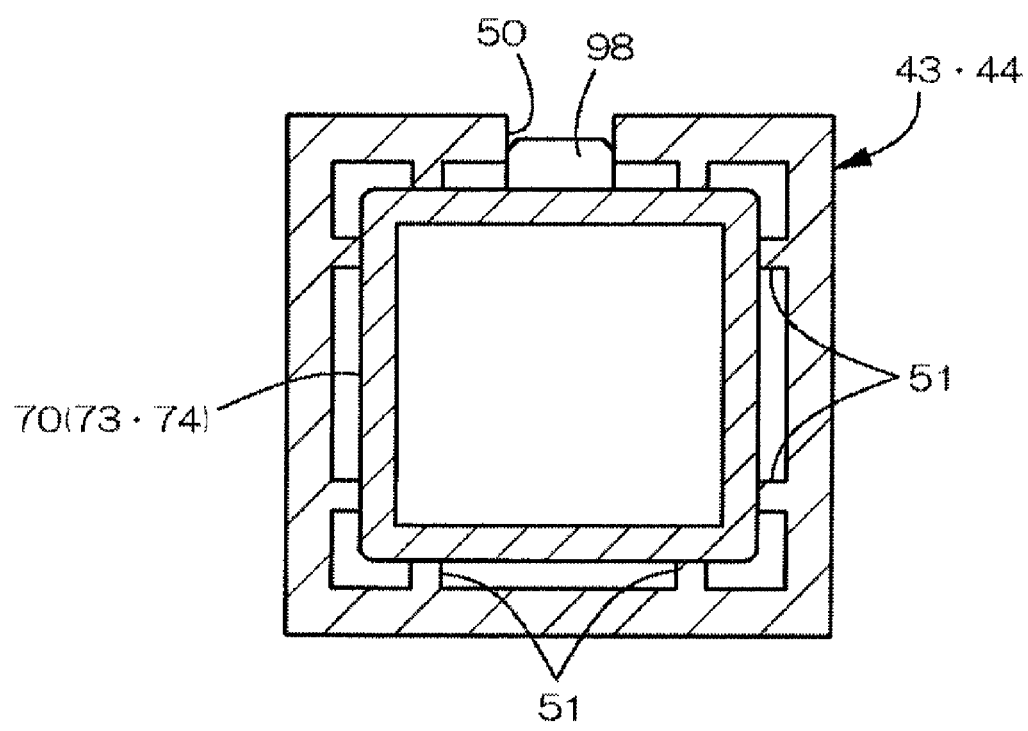
FIG. 10 is a sectional view taken along line D-D of FIG. 8.

As illustrated in FIG. 3, the four mounting units 41 to 44 are linearly disposed in the right and left direction. Each of the mounting units 41 to 44 preferably has a square cylindrical shape including an opening in a top thereof. As illustrated in FIGS. 7 and 10, a cylindrical wall of each of the mounting units 41 to 44 is preferably configured to have a cylindrical shape with an end and has a slit 50 on the rear side in the up and down direction. Two ribs 51 are provided in each inner surface of the cylindrical wall. Each rib 51 is arranged so as to reach an upper end from a lower end of the cylindrical wall.

In the four mounting units 41 to 44, the pair of mounting units 41 and 42 located in the central portion in the right and left direction is configured as a first mounting structure in order to mount the first platen cover 61. The pair of mounting units 43 and 44 located in both end portions in the right and left direction is configured as a second mounting structure in order to mount the second platen cover 62. That is, an interval between the support units 73 and 74 of the second platen cover 62 is preferably set to be larger than an interval between the support units 71 and 72 of the first platen cover 61, and correspondingly an interval between the mounting units 43 and 44 is preferably set to be larger than an interval between the mounting units 41 and 42. The reason the interval between the support units of the second platen cover 62 is larger than the interval between that of the first platen cover 61 is that a gravity center position is biased onto the side (left side) of the ADF 9 by providing the ADF 9.

In addition, as illustrated in FIG. 1, an external dimension of the support column 70 of the second platen cover 62 is preferably larger than an external dimension of the support column 70 of the first platen cover 61. Correspondingly internal dimensions of the mounting units 43 and 44, defined by inner surfaces of the ribs 51, are preferably larger than internal dimensions of the mounting units 41 and 42. The reason the external dimension of the support column 70 of the second platen cover 62 is larger than that of the first platen cover 61 is that a weight of the second platen cover 62 is increased by providing the ADF 9.

Figure 8:
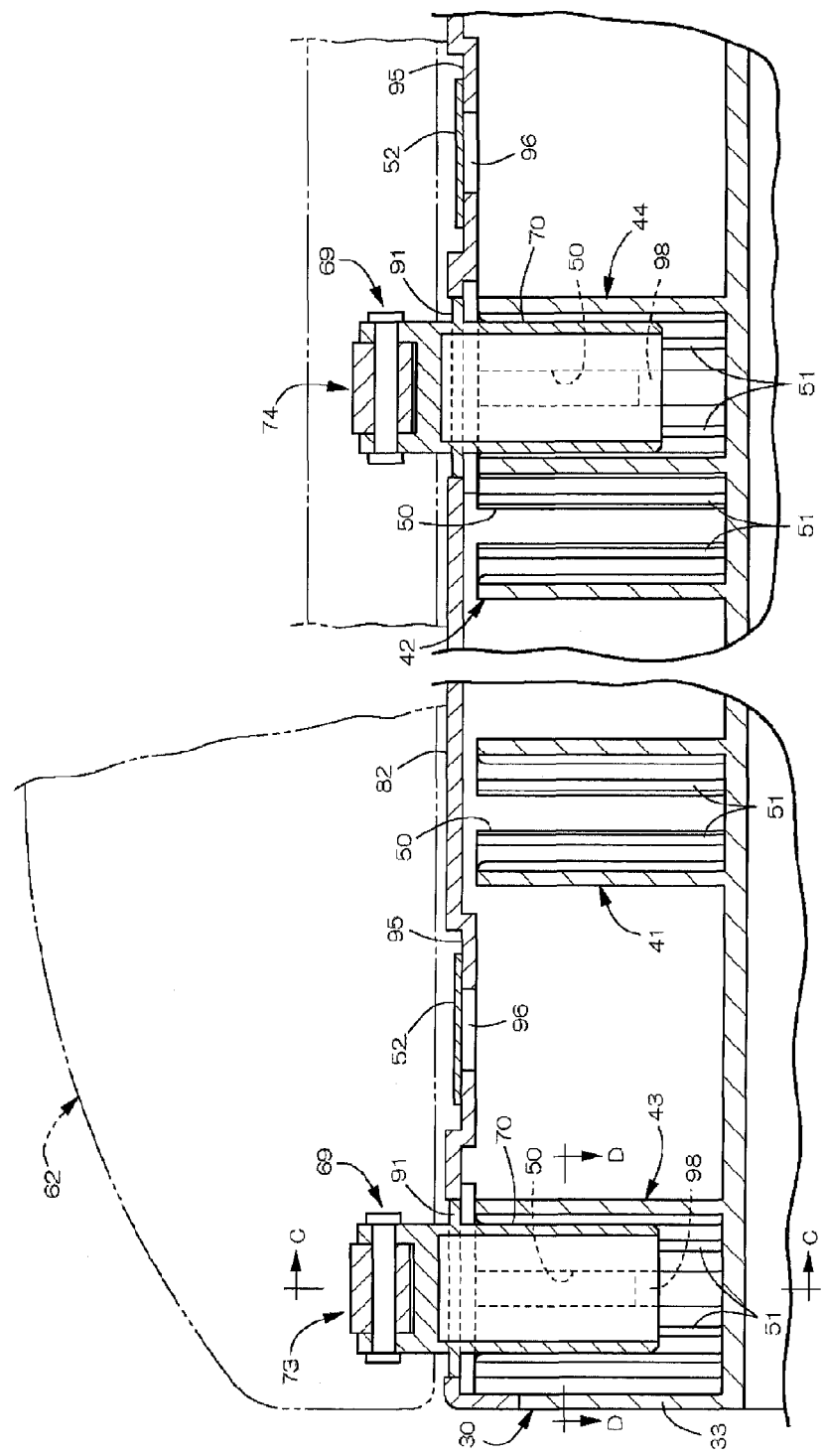
FIG. 8 is a longitudinal sectional front view illustrating a mounting structure of the second platen cover.

In FIGS. 1, 5, and 8, reference numerals 81 and 82 denote decorative covers with which the top of the step unit 30 in mounting the platen covers 6 (61, 62, and 63). The two kinds of decorative covers, that is, the first decorative cover 81 and the second decorative cover 82 are prepared. The first decorative cover 81 is used in mounting the first platen cover 61. The second decorative cover 82 is used in mounting the second and third platen covers 62 and 63.

As illustrated in FIG. 1, the first decorative cover 81 preferably is a plate-shaped plastic molding product, and the first decorative cover 81 includes a pair of right and left square openings 85 and 85 provided according to the mounting units 41 and 42 and a pair of right and left through holes 86 and 86 for screws provided according to the screw bosses 35. Similarly, the second decorative cover 82 preferably is a plate-shaped plastic molding product, and the second decorative cover 82 includes a pair of right and left square openings 87 and 87 provided according to the mounting units 43 and 44 and the pair of right and left through holes 86 and 86 for screws provided according to the screw bosses 35. Positions of the through holes 86 and 86 for the screws are matched in the decorative covers 81 and 82.

A pair of right and left square recesses 93 and 93 is formed in a peripheral edge of each of the upper surfaces of openings 85 and 87 in the first and second decorative covers 81 and 82. The recess 93 includes a receiving surface 92 that receives a square flange 91 hanging over in the upper portion of the support column 70. As illustrated in FIGS. 1 and 11, a pair of recesses 95 and 95 is formed adjacent to the opening of the second decorative cover 62. The recess 95 includes a receiving surface 94 that receives the support plate 77 of the third platen cover 63. Each of the recesses 95 and 95 preferably has a square shape, and through holes 96 and 97 are provided in each of the receiving surfaces 94 and 94 in order to allow the attaching bolt 48 and the screw 47 to be inserted therein.

Figure 9:
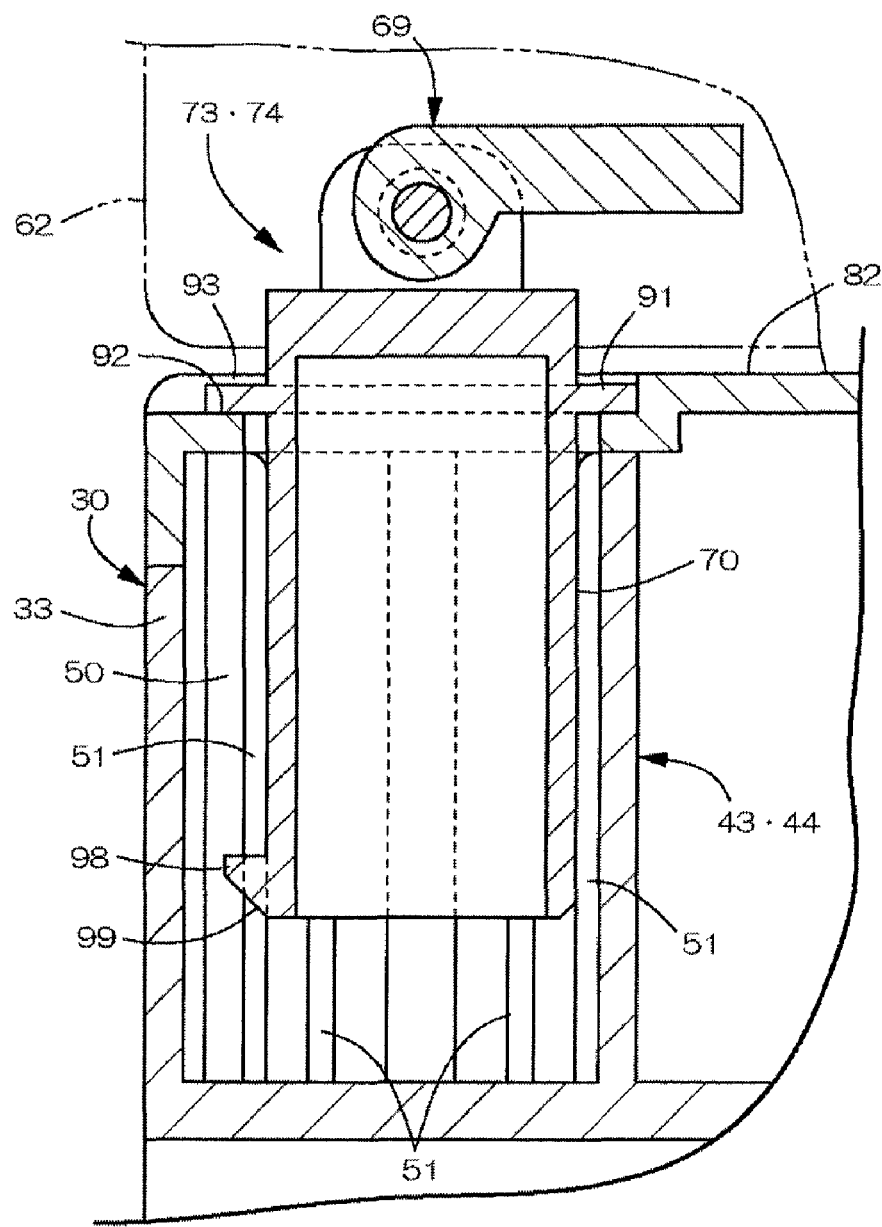
FIG. 9 is a sectional view taken along line C-C of FIG. 8.

As illustrated in FIGS. 1, 5, 6, 8, and 9, the square flanges 91 are arranged to hang over in the upper portions of the support columns 70 of the first and second platen covers 61 and 62. As illustrated in FIGS. 6 and 9, a retaining lock body 98 is projected from a lower end of the support column 70. The lock body 98 is provided in one (rear surface) of four surfaces of the support column 70. The lock body 98 is tapered such that a thickness of the lock body 98 is gradually decreased downward, and a guide surface 99 is provided at a lower end of the lock body 98 while inclined downward.

In attaching the first platen cover 61 to the machine body 3, a screw is inserted in the through hole 86 of the first decorative cover 81 while the step unit 30 is covered with the first decorative cover 81, and the lower end of the screw is screwed in a hole before threading of the screw boss 35 to fix the decorative cover 81 to the step unit 30. Then the support columns 70 of the first platen cover 61 are inserted in the openings 85 of the first decorative cover 81 to put the support columns 70 in the mounting units 41 and 42. At this time, the support columns 70 are inclined, and the support columns 70 are inserted in the openings 85 by utilizing the guide surfaces 99 of the lock bodies 98. The lock bodies 98 are aligned with the slits 50 of the mounting units 41 and 42, and the lock bodies 98 are put down along the slits 50. A moving-down limit of the support column 70 is regulated in such a manner that the flange 91 is received by the receiving surface 92 of the first decorative cover 81. After the support columns 70 are put in the mounting units 41 and 42, the upper surface of the lock body 98 is received by an opening edge of the opening 85 of the first decorative cover 81, which prevents the first platen cover 61 from being upwardly removed.

The second platen cover 62 is mounted in a procedure similar to that of the first platen cover 61 (see FIGS. 8 to 10). That is, the second decorative cover 82 is attached to the step unit 30 preferably using the screw, for example. Then, the lock bodies 98 are aligned with the slits 50, and the support columns 70 of the second platen cover 62 are put in the mounting units 43 and 44 through the openings 87 of the second decorative cover 82. As illustrated in FIG. 1, in mounting the second platen cover 62, a seal 52 adheres to the recess to close the through holes 96 and 97.

Figure 12:
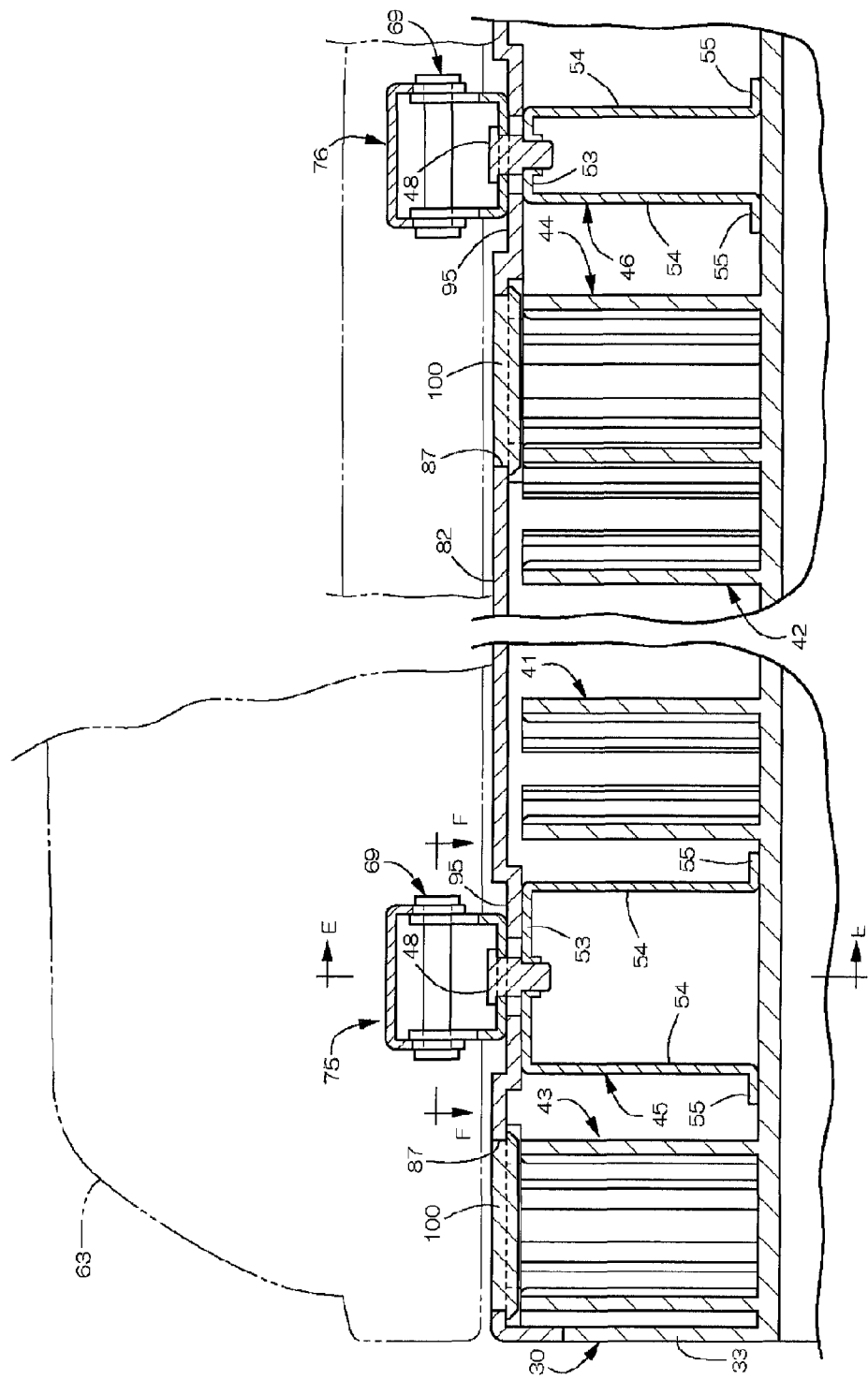
FIG. 12 is a longitudinal sectional front view illustrating a mounting structure of the third platen cover.
Figure 13:
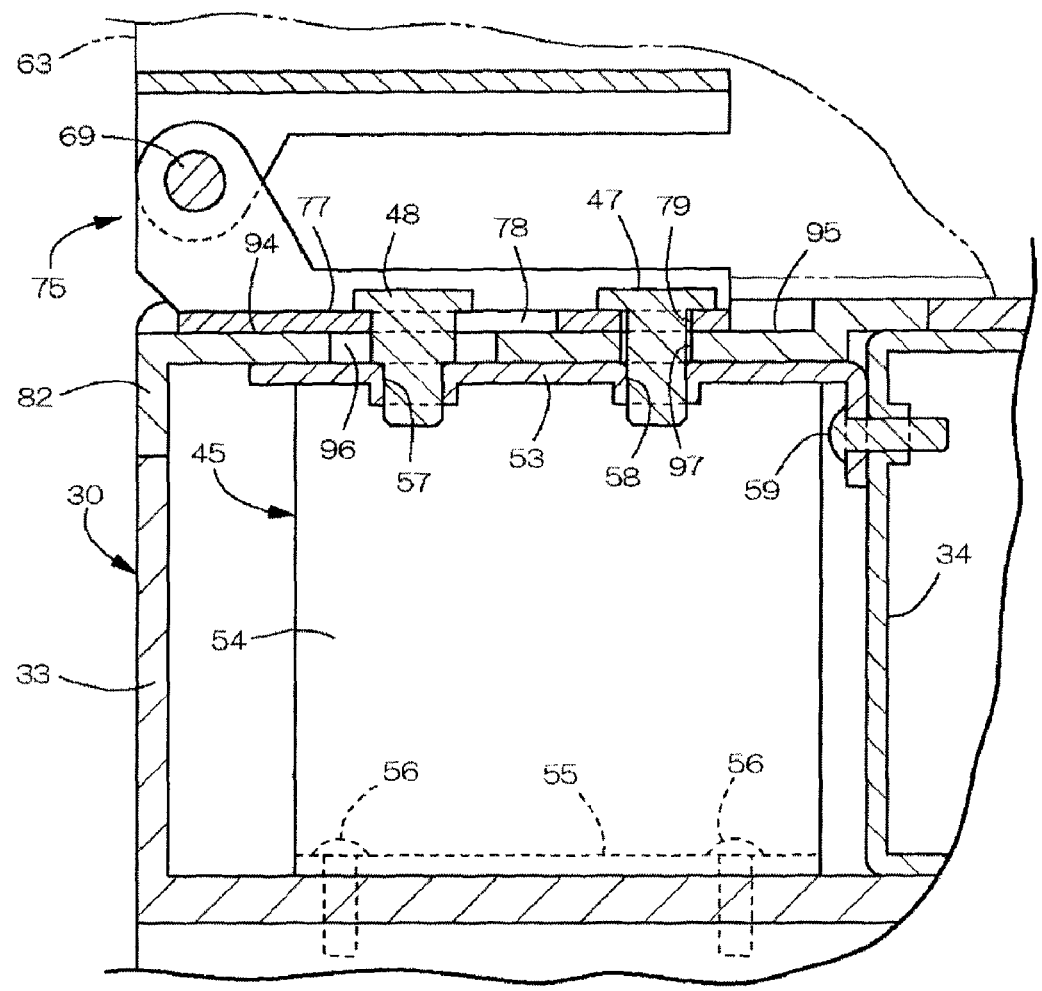
FIG. 13 is a sectional view taken along line E-E of FIG. 12.
Figure 14:
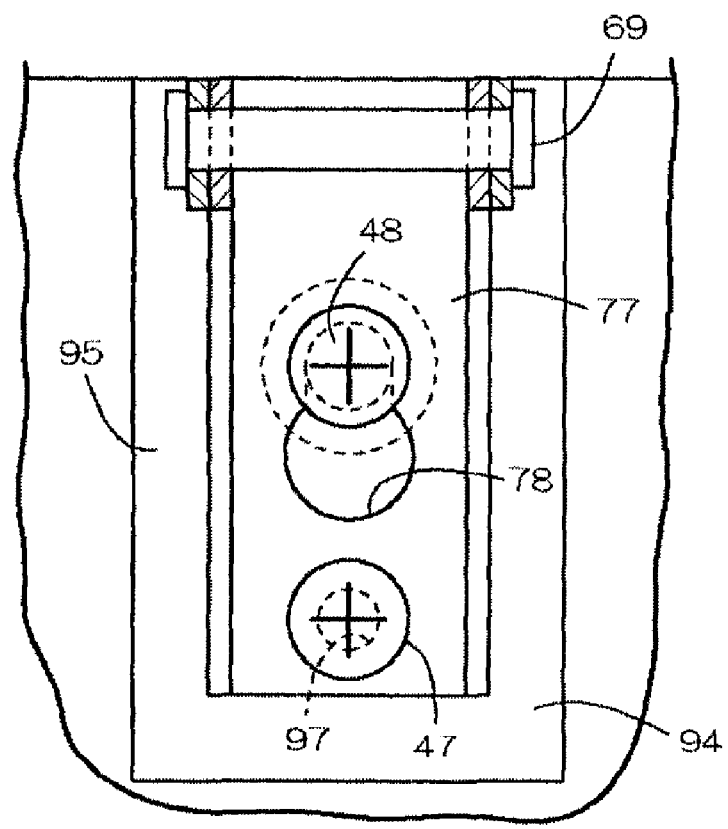
FIG. 14 is a sectional view taken along line F-F of FIG. 12.

FIGS. 11 to 14 illustrate a method for mounting the third platen cover 63 on the machine body 3. In mounting the third platen cover 63, first the metallic mounting pieces 45 and 46 are attached to the step unit 30. As illustrated in FIG. 12, the mounting pieces 45 and 46 are preferably hat shaped in section. Each of the mounting pieces 45 and 46 includes an upper wall 53, uprise walls 54 and 54, and joining pieces 55 and 55. The uprise walls 54 and 54 are continuously provided from right and left ends of the upper wall 53. The joining pieces 55 and 55 are arranged to hang horizontally over from the lower ends of the uprise walls 54 and 54 toward the outside in right and left. As illustrated in FIG. 13, the joining pieces 55 and 55 are fixed to the bottom surface 31 of the step unit 30 with the screws 56, which allows the mounting piece 45 and 46 to be attached to the step unit 30 without play. As illustrated in FIG. 13, the joining piece extending forward from the upper wall 53 is fixed to the frame 34 with a screw 59 on the side of the machine body 3, which also allows the mounting piece 45 and 46 to be attached to the step unit 30 without play. A threaded hole 57 and a threaded hole 58 are provided in the upper wall 53. The threaded hole 57 is used to fix the attaching bolt 48, and the threaded hole 58 is used to fix the screw 47.

After the mounting pieces 45 and 46 having the above-described configurations are fixed to the step unit 30, the attaching bolt 48 is fixed to the upper wall 53. Alternatively, the attaching bolt 48 may be previously fixed before the mounting pieces 45 and 46 are fixed to the step unit 30. Then the second decorative cover 82 is fixed to the step unit 30 with the screw. At this time, the attaching bolt 48 is aligned with the through hole 96, and a head of the attaching bolt 48 is projected from the upper surface of the second decorative cover 82. In the projected state, a micro gap is formed between the lower surface of the head of the attaching bolt 48 and the upper surface of the second decorative cover 82. The position of the through hole 97 of the decorative cover 82 is matched with the position of the threaded hole 58 of each of the pieces 45 and 46 while the second decorative cover 82 is attached to the step unit 30 as described above. In FIGS. 11 and 12, reference numeral 100 denotes a cover which closes the opening 87.

Then, the calabash through holes 78 provided in the support plates 77 of the support units 75 and 76 of the third platen cover 63 are aligned with the attaching bolts 48, and the heads of the attaching bolts 48 are exposed to the upper surfaces of the support plates 77 through the calabash through holes 78. More specifically, the head of the attaching bolt 48 is exposed to the upper surface of the support plate 77 through the through hole on the large diameter side of the calabash through hole 78. Then the third platen cover 63 is slid forward by utilizing the gap such that the through hole on the small diameter side is located below the attaching bolt 48. Finally, the screw 47 is inserted in the threaded hole 58 of each of the mounting pieces 45 and 46 through the through hole 79 of the support plate 77 and the through hole 97 of the second decorative cover 82, and the third platen cover 63 is fixed to the support plate 77. In the mounting state of the third platen cover 63 as described above, the support plates 77 of the support units 75 and 76 can be reliably fixed to the mounting pieces 45 and 46 with the attaching bolt 48 and the screw 47. Because the circumferential edge of the through hole on the small diameter side of the through hole 78 is received by the attaching bolt 48, the support plate 77 does not have any play. The third platen cover 63 is supported by the strong mounting structure defined by the metallic mounting pieces 45 and 46 and the support units 75 and 76 including the metallic support plates 77, so that the third platen cover 63 including the image scanning device 10 and the ADF 9 can be reliably supported.

As described above, in the image forming apparatus of the present preferred embodiment, the four mounting units 41, 42, 43, and 44 are linearly disposed in the machine body 3. The intervals of the support units (71 and 72, 73 and 74) of the first and second platen covers 61 and 62 differ from each other because the first and second platen covers 61 and 62 differs from each other in the weight depending on the presence or absence of the ADF 9. The first platen cover 61 is mounted on the machine body 3 using the mounting units 41 and 42, and the second platen cover 62 can be mounted on the machine body 3 using the mounting units 43 and 44. Further, the third platen cover 63 including the ADF 9 to which the image scanning device 10 is added can be mounted on the machine body 3 using the mounting pieces 45 and 46 attached to the step unit 30. Accordingly, only the support structure (the support frame structure of the machine body 3) of the step unit 30 is configured to be able to deal with the heaviest third platen cover 63, which allows the three platen covers 61, 62, and 63 to be mounted on the machine body 3 unlike the conventional technique in which the exchange of the support frame is required. Because the work of exchanging the support frame can be eliminated in mounting the platen covers 61, 62, and 63, the mounting work of the platen covers 61, 62, and 63 can be performed rapidly and efficiently. It is not necessary to prepare a plurality of kinds of support frames, and the number of components is decreased. Therefore, the overall cost of the image forming apparatus can be reduced.

In the present preferred embodiment, the use of the first decorative cover 81 and the second decorative cover 82 can deal with and accommodate the three kinds of platen covers (first to third platen covers 61, 62, and 63). Accordingly, compared with the mode in which the three kinds of decorative covers are prepared, the number of components concerning the decorative cover can be decreased, the component can be shared, and the overall cost of the image forming apparatus can be reduced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An image forming apparatus comprising:
   an image scanning unit that is provided in an upper portion of a machine body to scan document image information;
   a platen cover that includes a pair of support units and a cover body, the support units each including a hinge member, the cover body being supported while being openable through the hinge member, the cover body opening and closing a document scanning surface located in an uppermost surface of the image scanning unit; and
   a mounting unit that is provided adjacent to the document scanning surface in the upper portion of the machine body in order to mount the support unit on the machine body; wherein
   at least three mounting units are linearly disposed in the machine body; and
   two kinds of platen covers, which are different from each other in weight and an interval between the support units, are mounted on the machine body via two of at least three mounting units.

2. The image forming apparatus according to claim 1, wherein
   a platen cover attaching unit including a bottom surface oriented upward is provided adjacent to the document scanning surface in the machine body,
   each of the at least three mounting units includes a hollow cylinder extending upward from a bottom surface of the platen cover attaching unit, the hollow cylinder including an opening on a top thereof,
   each of the support units includes a columnar support body that is attached to a respective one of the least three mounting units by putting the columnar support body in the respective one of the at least three mounting units,
   support bodies constituting the two kinds of platen covers are different from each other in external dimension, and
   the hollow cylinder mounting units are different from each other in internal dimension according to the external dimensions of the support bodies.

3. The image forming apparatus according to claim 2, wherein
   a metallic mounting unit is provided in addition to the hollow cylinder mounting units and is detachably attached to the platen cover attaching unit, and
   a third platen cover including a metallic support unit fixed to the metallic mounting unit is configured to be able to be mounted on the machine body.

4. An image forming apparatus comprising:
   an image scanning unit that is provided in an upper portion of a machine body to scan document image information;
   a platen cover that includes a pair of support units and a cover body, the support units each including a hinge member, the cover body being supported while being openable through the hinge member, the cover body opening and closing a document scanning surface located in an uppermost surface of the image scanning unit;
   a mounting unit that is provided adjacent to the document scanning surface in the upper portion of the machine body in order to mount the support unit on the machine body;
   a platen cover attaching unit including a bottom surface oriented upward and located adjacent to the document scanning surface in the machine body; and
   a first mounting structure and a second mounting structure provided in the platen cover attaching unit, the first mounting structure including two hollow cylinder mounting units that attach a first platen cover not including an automatic document feeder, the second mounting structure including two hollow cylinder mounting units that attach a second platen cover including the automatic document feeder; wherein
   an interval between the two mounting units of the second mounting structure is larger than an interval between the two mounting units of the first mounting structure;
   an external dimension of the support unit of the first platen cover is smaller than an external dimension of the support unit of the second platen cover; and
   internal dimensions of the two mounting units of the first mounting structure are smaller than internal dimensions of the two mounting units of the second mounting structure according to the external dimensions of the support units of the first and second platen covers.

5. The image forming apparatus according to claim 4, wherein
   a third platen cover including an automatic document feeder is configured to be able to be mounted on the machine body in addition to the first and second platen covers,
   in order to mount the third platen cover, a metallic mounting piece is provided in the platen cover attaching unit in addition to the hollow cylinder mounting units of the first and second mounting structures and is detachably attached to the platen cover attaching unit, and
   the third platen cover includes a metallic support unit fixed to the metallic mounting piece.

6. The image forming apparatus according to claim 5, wherein a first decorative cover and a second decorative cover are configured to be able to be mounted on the machine body, the first decorative cover including two openings at a position corresponding to each of the two mounting units of the first mounting structure, the second decorative cover including two openings at a position corresponding to each of the two mounting units of the second mounting structure.

* * * * *